(12) United States Patent
Schmaltz et al.

(10) Patent No.: US 11,121,873 B2
(45) Date of Patent: Sep. 14, 2021

(54) SYSTEM AND METHOD FOR HARDENING SECURITY BETWEEN WEB SERVICES USING PROTECTED FORWARDED ACCESS TOKENS

(71) Applicant: Microsoft Technology Licensing, LLC, Redmond, WA (US)

(72) Inventors: Douglas Brent Schmaltz, Redmond, WA (US); Maria Furman, Redmond, WA (US); Jean-Marc Prieur, Ollioules (FR); Amit Kumar, Redmond, WA (US); Yordan I. Rouskov, Seattle, WA (US); Sriram Dhanasekaran, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 16/271,468

(22) Filed: Feb. 8, 2019

(65) Prior Publication Data

US 2020/0259652 A1    Aug. 13, 2020

(51) Int. Cl.
*H04L 9/32* (2006.01)
*H04L 9/14* (2006.01)
(Continued)

(52) U.S. Cl.
CPC .............. *H04L 9/3213* (2013.01); *H04L 9/30* (2013.01); *H04L 9/3242* (2013.01);
(Continued)

(58) Field of Classification Search
CPC . H04L 9/32; H04L 9/3213; H04L 9/30; H04L 9/3242; H04L 9/3247; H04L 29/06;
(Continued)

(56) References Cited

U.S. PATENT DOCUMENTS 8,060,748 B2 * 11/2011 Johansson ........... H04L 63/0807
726/9
2006/0235795 A1 * 10/2006 Johnson ................. G06Q 20/02
705/44

(Continued)

OTHER PUBLICATIONS

Electronic Authentication Guideline by William E. Burr, Donna F. Dodson, Elaine M. Newton, Ray A. Perlner, W. Timothy Polk, Sabri Gupta and Emad A. Nabbus pp. 122; NIST Feb. 2013.*

(Continued)

*Primary Examiner* — Samson B Lemma
*Assistant Examiner* — Ali H. Cheema
(74) *Attorney, Agent, or Firm* — Fiala & Weaver P.L.L.C.

(57) ABSTRACT

Methods for hardening security between web services using protected forwarded access tokens are implemented via systems and devices. User applications receive user tokens with user information from an identity provider and provide the user tokens to first services with data requests. Each first service extracts and transforms a portion of a user token to validate a user token signature, and determines a target service for the data request. The first services acquire actor tokens from the identity provider that uniquely identify the first services using public keys, and then generate authentication tokens, signed with corresponding private keys, that encapsulate the actor tokens and the transformed user tokens. The signed authentication tokens are provided to target services which validate the authentication tokens as well as the encapsulated tokens and their respective signatures. Upon validation, requested data is retrieved and provided back for the user applications from the target services.

20 Claims, 6 Drawing Sheets

(51) Int. Cl.
*H04L 9/08* (2006.01)
*H04L 9/06* (2006.01)
*H04L 29/06* (2006.01)
*H04L 9/30* (2006.01)

(52) U.S. Cl.
CPC .......... *H04L 9/3247* (2013.01); *H04L 9/0637* (2013.01); *H04L 9/0643* (2013.01); *H04L 9/0866* (2013.01); *H04L 9/0894* (2013.01); *H04L 9/3231* (2013.01); *H04L 9/3239* (2013.01); *H04L 9/3271* (2013.01)

(58) Field of Classification Search
CPC ... H04L 63/0807; H04L 63/08; H04L 9/3239; H04L 9/3231; H04L 9/14; H04L 9/0866; H04L 9/0894; H04L 9/0637; H04L 9/0643; H04L 9/3271; H04L 2209/38; H04L 2209/56; G06F 21/33; G06F 21/41
USPC ................. 713/159, 169, 176, 185; 726/6, 9
See application file for complete search history.

(56) References Cited

U.S. PATENT DOCUMENTS

| | | | | |
|---|---|---|---|---|
| 2010/0212004 A1* | 8/2010 | Fu | ........................... | H04L 63/08 726/9 |
| 2010/0325441 A1* | 12/2010 | Laurie | ................. | H04L 63/0815 713/185 |
| 2012/0254957 A1* | 10/2012 | Fork | ................... | H04L 63/0807 726/6 |
| 2014/0282986 A1* | 9/2014 | Leung | ..................... | H04L 63/10 726/9 |
| 2015/0100788 A1* | 4/2015 | Chastain | ............... | H04L 9/3247 713/169 |
| 2016/0142409 A1* | 5/2016 | Frei | ..................... | H04L 63/0884 713/176 |
| 2016/0259936 A1* | 9/2016 | Mukherjee | .............. | G06F 21/41 |
| 2018/0034858 A1* | 2/2018 | Gummaraju | ........ | H04L 63/1433 |
| 2018/0367544 A1* | 12/2018 | Mihara | ................ | H04L 63/0807 |
| 2019/0097802 A1* | 3/2019 | Rowe | ................... | H04L 9/3213 |
| 2019/0124070 A1* | 4/2019 | Engan | ................ | H04L 63/0272 |
| 2019/0349360 A1* | 11/2019 | Yeddula | ............. | H04L 63/0807 |
| 2019/0372957 A1* | 12/2019 | Dunjic | ................... | H04L 63/10 |
| 2020/0136825 A1* | 4/2020 | Gupta | .................. | H04L 9/3213 |

OTHER PUBLICATIONS

Understanding JSON WEB Tokens by Sathya Bandra pp. 6; Jul. 23, 2017.*

OAuth: JWT as an Access Token by Leo Farrell pp. 10; Jul. 19, 2018.*

"International Search Report and Written Opinion Issued in PCT Application No. PCT/US20/14544", dated Apr. 20, 2020, 34 Pages.

* cited by examiner

SYSTEM AND METHOD FOR HARDENING SECURITY BETWEEN WEB SERVICES USING PROTECTED FORWARDED ACCESS TOKENS

BACKGROUND

Web services and microservices may be invoked by applications and by other web services and microservices. In distributed systems and networks, e.g., cloud-based systems, a web service or a microservice invoked by an application may need to interact with one or more other web services or microservices. For example, a web service may receive a request from an application on behalf of a user that requires the web service to access data on another server that hosts a microservice related to the web service. In such cases, the web service communicates with the microservice on behalf of the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for hardening security between web services using protected forwarded access tokens are implemented via systems and devices. A user application receives a user token with user information from an identity provider and provides the user token to a first service with a data request. The user token is generated and signed using an encrypted, nonce, but the user token provided to the user includes the original, unencrypted nonce. The first service extracts and transforms the original, unencrypted nonce of the user token to validate the user token signature against the encrypted nonce. The first service also determines a target service for the data request from the user application. The first service acquires an actor token from the identity provider that uniquely identifies the first service using a public key, and then generates an authentication token, signed with a corresponding private key, that encapsulates the actor token and the transformed user token. The signed authentication token is provided to the target service which validates the authentication token as well as the encapsulated tokens and their signatures. Upon validation, the data is retrieved and provided back for the user application from the target service. Actor tokens are provided with valid life times such that the actor tokens may be used during the valid life times without additional requests/calls to identity providers. This significantly decreases network traffic for, and processing/memory usage of, identity provider hosts.

Further features and advantages, as well as the structure and operation of various examples, are described in detail below with reference to the accompanying drawings. It is noted that the ideas and techniques are not limited to the specific examples and/or specific systems, platforms and languages described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
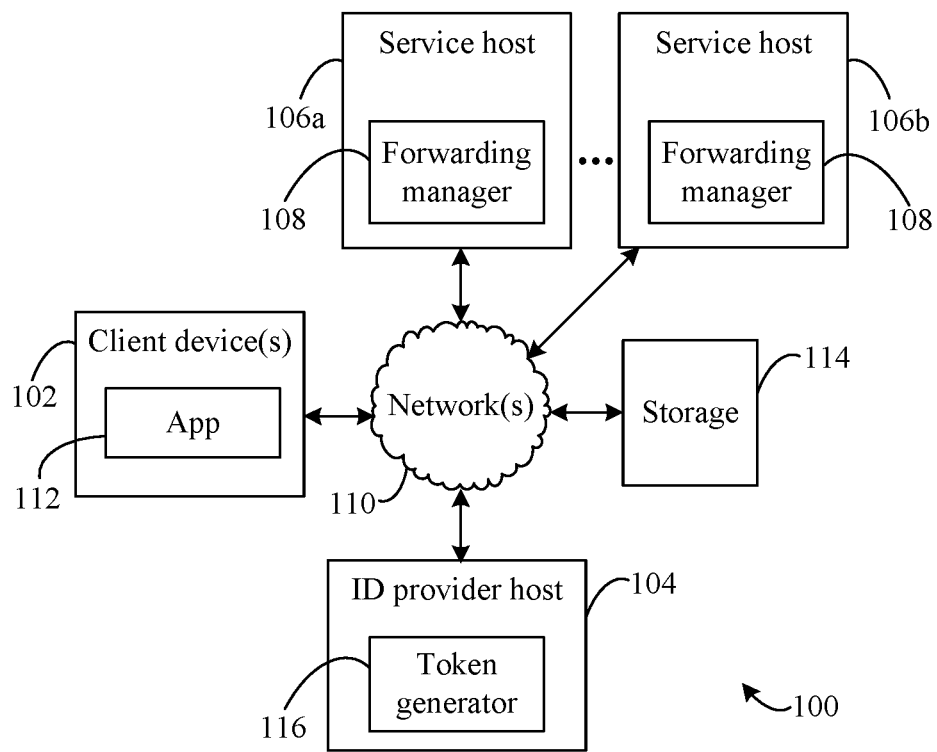
FIG. 1 shows a block diagram of a networked system for hardening security between web services using protected forwarded access tokens, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for hardening security between web services using protected forwarded access tokens. Section III below describes example mobile and computing device embodiments that may be used to implement features of the embodiments described herein. Section IV below describes additional examples and advantages, and Section V provides some concluding remarks.

II. Example Embodiments for Hardening Security Between Web Services Using Protected Forwarded Access Tokens Methods for hardening security between web services using protected forwarded access tokens are implemented via systems and devices. When an application of a user, executing at a user device, interacts with a first web service and provides a request that specifies access to data, the data may reside on or be stored in association with another server that hosts a second service/microservice related to the initially interacted with first web service. In such cases, the first web service (or front end service) must contact the second service/microservice (or back end service) "on behalf of" (OBO) the user.

However, security issues may arise with OBO interactions between hosted services because the scope of user consent for the data access may be difficult to ascertain through OBO tokens. For example, with OBO tokens, where the front end service wishes to acquire a token for the back end service on behalf of the user, the "audience" of the token, i.e., the identified entity that can use the token, is not secure or strictly defined, while the user token received by the front end service host would have an audience of the back end service host. Thus, standard OBO tokens are vulnerable to replays and forwarding attacks from other entities.

Accordingly, security solutions must be able to scale efficiently in such an environment of connected services, including multiple connected services and microservices, without sacrificing security. "Protected forwarded access tokens," as described herein, encompass a cryptography and token exchange implementation that provides for a front end web service to acquire a user token and a service/actor token ("actor token" herein), and forward these tokens modified in such a way that back end service(s) are able to verify validity, trust, and user consent. That is, back end service(s) are able to verify that both of the tokens are valid and trustworthy, and to verify that the actor token is only valid for the sender (i.e., the first web service) rather than being susceptible to interception and replay, while not having the ability at the back end service(s) to turn around and use those tokens elsewhere. Embodiments herein may utilize a preexisting trust relationship between front-/back-end hosts and identity provider hosts to facilitate hardening security between web services using protected forwarded access tokens.

In the context of the described embodiments, a user may be "logged in" to a web service or group of services before the described embodiments are implemented, or at the initiation of the described embodiments, without altering the scope and performance thereof. For instance, a user may be granted access through a user application to a service or group of services via user credentials or any other type of authentication protocol prior to requesting data, or as an initial step to requesting data, without altering the utilization of the protected forwarded access tokens described herein. As an example, a user may sign in to a service or group of services through a browser or portal to access data via an identity provider or a front end web service that redirects the user request to the identity provider. Likewise, a user may be logged in prior to the request for data.

In either case, the user may request data via the user application executing at the user device. The user application may receive a user token with user information from the identity provider and provide the user token to the first web service along with a data request and the user information. As described herein, the data request may include the user information, in embodiments. A user token may be generated and signed by the identity provider using an encrypted nonce. However, the identity provider may provide an untransformed user token to the user application that includes the original, unencrypted nonce, but that still has the digital signature based on the encrypted nonce. When the user application passes this untransformed user token to the first web service, the original, unencrypted nonce of this user token is extracted and transformed/encrypted by the first web service validate the user token signature against the encrypted nonce. In effect, the transformed user token that is generated by the identity provider is recreated by the first web service for validation of the digital signature.

The first web service also determines a target service for the data request from the user application—in this example, the target service is the second service/microservice. The first web service requests and acquires an actor token from the identity provider. This token uniquely identifies the first web service and includes a public key that is provided to the identity provider by the first web service. The first web service then generates an authentication token that is signed with a corresponding private key of the first web service and that encapsulates the actor token and the transformed user token.

The signed authentication token is provided to the target service, i.e., the second service/microservice, which validates the authentication token as well as the encapsulated tokens and their respective signatures. The target service may decode the actor token, extract the public key, and use the public key to validate the authentication token signature and the actor token signature, as well as validate the transformed user token using metadata obtained from the identity provider. Upon validation, the requested data is retrieved and provided back for the user application from the target service. In embodiments, the data is received by the first web service and then provided to the user application, and may be provided along with the original user token.

Actor tokens may be generated and provided with valid life times, or the life times may be set by end points, or back end, target services, that receive the actor tokens. Thus, these actor tokens may be used during the valid life times without additional requests/calls to identity providers. This call reduction reduces network traffic to identity provider hosts, reduces resources such as processing cycles and memory footprint needed to handle such calls, thus improving the performance of identity providers as well as service hosts, and it also protects in cases when end points go offline. In embodiments, for example, subsequent requests for data by the user, and by other users, via the first web service may cause additional authentication tokens to be generated with the same actor token and provided to the target service, i.e., the second service/microservice thus eliminating the need for calls to the identity provider for tokens on each data request. This significantly decreases network traffic for, and processing/memory usage of, identity provider hosts that handle many calls for each user, over thousands, tens of thousands, or more users in a given time period, and fewer requests also reduces processing/memory usage at service hosts.

The term "service" used herein, e.g., in the context of hosted services and web services, are meant to generally include web services and microservices unless expressly noted otherwise in the description. It is also contemplated herein that the embodiments for hardening security between web services using protected forwarded access tokens may be adapted to applications and web applications. It is further contemplated herein that while some embodiments may be described in association with certain types of tokens or protocols, the embodiments described are applicable to, and may be adapted to, any type of tokens or protocols and syntax or implementation-specific details thereof.

In other words, the embodiments herein provide for hardening security between web services using protected forwarded access tokens including requiring services receiving user tokens to recreate encryptions/hashes of nonce values to validate the user tokens, and providing authentication tokens, signed with private keys of the receiving services, that encapsulate the user tokens and actor tokens (with corresponding public keys) for the receiving services to target services. These and further embodiments are described in greater detail as follows.

Systems and devices may be configured in various ways for hardening security between web services using protected forwarded access tokens. For instance, FIG. 1 is a block diagram of a computing system 100 ("system 100" hereinafter), according to embodiments. System 100 is configured to enable hardening security between web services using protected forwarded access tokens, according to embodiments. As shown in FIG. 1, system 100 includes a client device 102, an identity (ID) provider host 104, a service host 106a, and a service host 106b, which may communicate with each other over a network 110. It should be noted that any numbers of client devices, ID provider hosts, and/or service hosts may be present in various embodiments. Additionally, any combination of the components illustrated in FIG. 1 may be present in system 100, according to embodiments.

As noted above, client device 102, ID provider host 104, service host 106a, and service host 106b are communicatively coupled via network 110. Network 110 may comprise any type of communication links that connect computing devices and servers such as, but not limited to, the Internet, wired or wireless networks and portions thereof, point-to-point connections, local area networks, enterprise networks, the "cloud," and/or the like.

ID provider host 104 may comprise one or more server computers or computing devices, which may include one or more distributed or "cloud-based" servers. In embodiments, ID provider host 104 may be associated with, or may be a part of, a cloud-based service platform such as Microsoft® Azure® from Microsoft Corporation of Redmond, Wash. ID provider host 104 may be configured to provide user access/credential checking of user account information for associated services/microservices, e.g., as hosted by service host 106a and/or service host 106b. ID provider host 104 may be configured to generate tokens by a token generator 116. Token generator 116 may be configured to generate tokens of various types as described herein, including but without limitation, user tokens and actor tokens, described in further detail below.

Service host 106a and service host 106b may comprise one or more server computers or computing devices, which may include one or more distributed or "cloud-based" servers, as similarly described above for ID provider host 104. Hosted services (including web services, microservices, etc.) may be one or more of any type of service for which data and user data is associated. For example, hosted services may be one or more services, or ones similar to those, hosted by Microsoft® Azure®, and as described elsewhere herein, such as services for Office 365® from Microsoft Corporation of Redmond, Wash., or services similar and/or analogous thereto. Service host 106a and/or service host 106b may each include an instance of a forwarding manager 108 that is configured for hardening security between web services using protected forwarded access tokens, as described in further detail herein.

For example, forwarding manager 108 may be configured to receive user tokens for data requests and recreate encryptions/hashes of nonce values in the user tokens to perform validations thereof. Forwarding manager 108 may also be configured to generate authentication tokens, signed with private keys of the instantiating services/hosts, that encapsulate transformed user tokens and actor tokens for the receiving services (having corresponding public keys therein) to provide to target services for retrieving requested data. At the target services, forwarding manager 108 may be configured to validate the received authentication token by extracting the public key, and to retrieve/return the requested data. In embodiments, any number of service hosts may be included (not shown for brevity), and service host 106a and/or service host 106b may also include services that are stand-alone rather than hosted.

System 100 may include a storage 114, that may be a stand-alone storage system (as shown), and/or may be internally or externally associated with ID provider host 104, service host 106a, or service host 106b. That is, storage 114 may be any type of storage device or array of devices, and while shown as being communicatively coupled to network 110 as be networked storage that is accessible via network 110, additional instances of storage 114 may be included in addition to, or in lieu of, the embodiment shown including as storage for hosts/services illustrated. Storage 114 is configured to store different types of data, including but not limited to, user data, any types of documents, sales or business information, media/multi-media files, calendar information, electronic mail and associated data, and/or the like, for which a user may request access. In embodiments, metadata, credential/security data including public/private key pairs, etc., may also be stored by storage 114.

Client device 102 may be any type of computing device or computing system, including a terminal, a personal computer, a laptop computer, a tablet device, a smart phone, a personal digital assistant, and/or the like that may be utilized to execute an application 112 (also "app" 112). Application 112 may be any type of application that communicates with hosted services for access to user data and with ID providers as described herein, including but not limited to, a web browser, a portal application, utility program such as email, productivity, or media programs, and/or the like. In embodiments, client device 102 may be used by various types of users, such as an administrator, support staff, customers, clients, and/or the like that are associated with applications and/or services which store user data, e.g., in storage 114.

Forwarding managers 108 as shown for service host 106a and service host 106b, as well as token generator 116 of ID provider host 104, may be implemented in hardware, hardware combined with one or both of software and/or firmware, and/or as program instructions encoded on computer-readable storage media, and may be configured to perform any functions and/or operations described herein associated with hardening security between web services using protected forwarded access tokens.

In embodiments, an instance of forwarding manager 108 may be implemented for a distributed host group such as service host 106a and service host 106b. In such an example, this distributed group may receive requests, data, and/or information queries from ID provider host 104 and/or client device 102 according to embodiments herein. Additionally, one or more portions of service host 106a and service host 106b manager 108 may be distributed or duplicated between service host 106a and service host 106b in various scalable implementation examples.

It should be noted that as described herein, embodiments of system 100, including any portions thereof, are applicable to any type of system architecture in which user data requested by a user at a first host or service is maintained or stored by another host/service. One example noted here is where service host 106a and service host 106b are in a "cloud" implementation or group of services in a network architecture/platform. Such a cloud platform may include a networked set of computing resources, including servers, routers, etc., that are configurable, shareable, provide data security, and are accessible over a network, such as the Internet. Cloud implementations, e.g., for identity providers and/or services in embodiments, may run on these computing resources, often atop operating systems that run on the resources, for entities that access the implementations/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

These and further embodiments are described in greater detail as follows.

Figure 2:
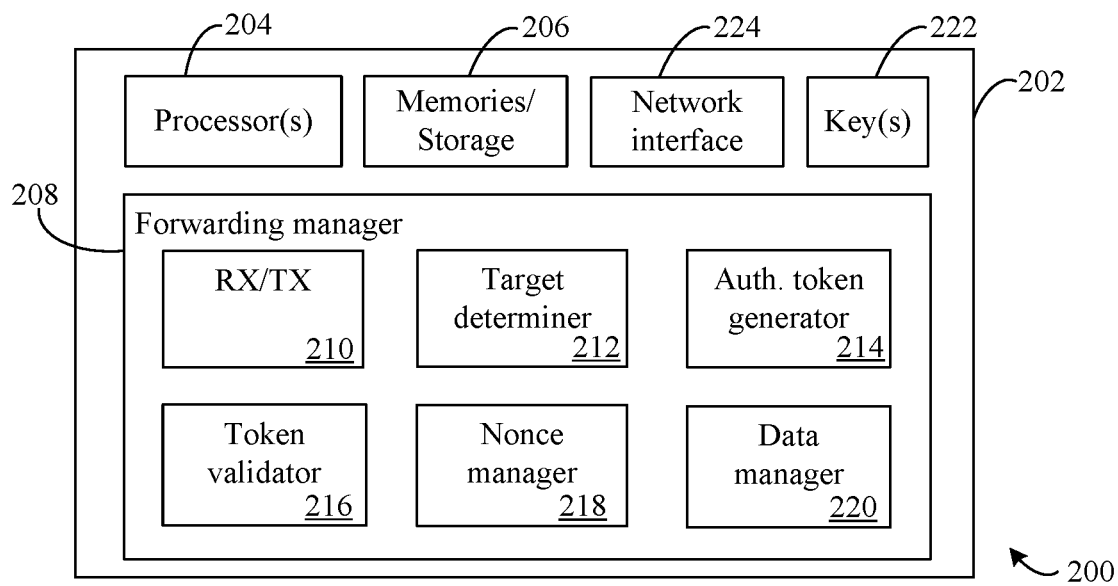
FIG. 2 shows a block diagram of a system for hardening security between web services using protected forwarded access tokens, according to an example embodiment.

Systems and devices may be configured in various ways for hardening security between web services using protected forwarded access tokens. A service host such as service host 106a and/or service host 106b may be configured in various ways for improvements and enhancements therefor. For example, FIG. 2 is a block diagram of a system 200 configured for such improvements and enhancements. System 200 may be an embodiment of system 100 of FIG. 1. System 200 is described as follows.

System 200 includes a computing device 202, which may be an embodiment of service host 106a and/or service host 106b of FIG. 1, and may be any type of server or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 224, and a forwarding manager 208 that may be an embodiment of forwarding manager 108 of FIG. 1. System 200 may also include additional components (not shown for brevity and illustrative clarity) including, but not limited to, components and subcomponents of other devices and/or systems herein, as well as those described below with respect to FIGS. 9 and 10, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be a multi-core processor configured to execute more than one processing thread concurrently. Processor 204 comprises circuitry that is configured to execute computer program instructions such as but not limited to embodiments of forwarding manager 208, which may be implemented as computer program instructions for hardening security between web services using protected forwarded access tokens, etc., as described herein. Memory 206 may include storage 114 of FIG. 1 in embodiments, and may be configured to store such computer program instructions/code, as well as to store other information and data described in this disclosure including, without limitation, one or more public/private key pairs shown as key(s) 222, etc.

Network interface 224 may be any type or number of wired and/or wireless network adapter, modem, etc., configured to enable system 200 to communicate with other devices over a network, such as communications between system 200 and other devices utilized in a network as described herein (e.g., client device 102, ID provider host 104, service host 106a, and/or service host 106b) over a network such as network 110 as described above with respect to FIG. 1.

Forwarding manager 208 includes a plurality of components for performing the functions and operations described herein for hardening security between web services using protected forwarded access tokens. For instance, when instantiated at a host of a first web service, forwarding manager 208 is configured to receive, transform, and validate user tokens with requests for user data, and in response, determine a target service for the data request, acquire an actor token from an identity provider, generate an authentication token that encapsulates the user token and the actor token, and provide the authentication token to the target service. When instantiated at a host of a target service, forwarding manager 208 is configured to receive the authentication token, validate the authentication token and the tokens therein, and retrieve the requested data.

As shown, forwarding manager 208 includes a receive-transmit manager 210, a target determiner 212, an authentication token generator 214, a token validator 216, a nonce manager 218, and a data manager 220. While shown separately for illustrative clarity, in embodiments, one or more of receive-transmit manager 210, target determiner 212, authentication token generator 214, token validator 216, nonce manager 218, and/or data manager 220, may be combined together and/or as a part of other components of system 200. In some embodiments, less than all of the components of forwarding manager 208 illustrated in FIG. 2 may be included. In software implementations, one or more components of forwarding manager 208 may be stored in memory 206 and are executed by processor 204.

For example, forwarding manager 208 may be configured to receive user tokens for data requests and recreate encryptions/hashes of nonce values in the user tokens to perform validations thereof. Forwarding manager 208 may also be configured to generate authentication tokens, signed with private keys of the instantiating services/hosts, that encapsulate transformed user tokens and actor tokens for the receiving services (having corresponding public keys therein) to provide to target services for retrieving requested data. At the target services, forwarding manager 208 may be configured to validate the received authentication token by extracting the public key, and to retrieve/return the requested data.

Receive-transmit manager 210 may be configured to receive and transmit requests, data, and information, including various tokens as described herein. Target determiner 212 may be configured to determine target services for requests for data. Authentication token generator 214 may be configured to generate authentication tokens. Authentication tokens may encapsulate actor tokens and transformed user tokens for provision to target services. Authentication tokens may be signed using private keys of public/private key pairs of hosts/services at which the authentication tokens are generated. Token validator 216 may be configured to validate untransformed user tokens that accompany requests for data, actor tokens that include public keys, transformed user tokens, and/or authentication tokens, as described herein. In embodiments, token validator 216 validates user tokens by verifying the digital signature. Nonce manager 218 may be configured to encrypt or transform a nonce received in a user token. Nonce manager 218 may encrypt/transform a nonce by performing a hash on the nonce value. Data manager 220 may be configured to retrieve requested data from a data storage.

Accordingly, forwarding manager 208 may operate in various ways to enable improvements in hardening security between web services using protected forwarded access tokens. Additional details regarding forwarding manager 208 and its components are provided below.

As noted above, a first web service may function as a front end service that contacts a second service/microservice functioning as a back end service, or one of a group of back end services. That is, a user via a user device may provide a user token with a request for data to a front end service when the data itself is stored or managed by a different back end service or microservice. While not so limited, and for illustrative and descriptive purposes, in the context of the embodiments described below, a service host such as service host 106a may function as a front end service host, while a service host such as service host 106b may function as a back end service host.

Figure 3:
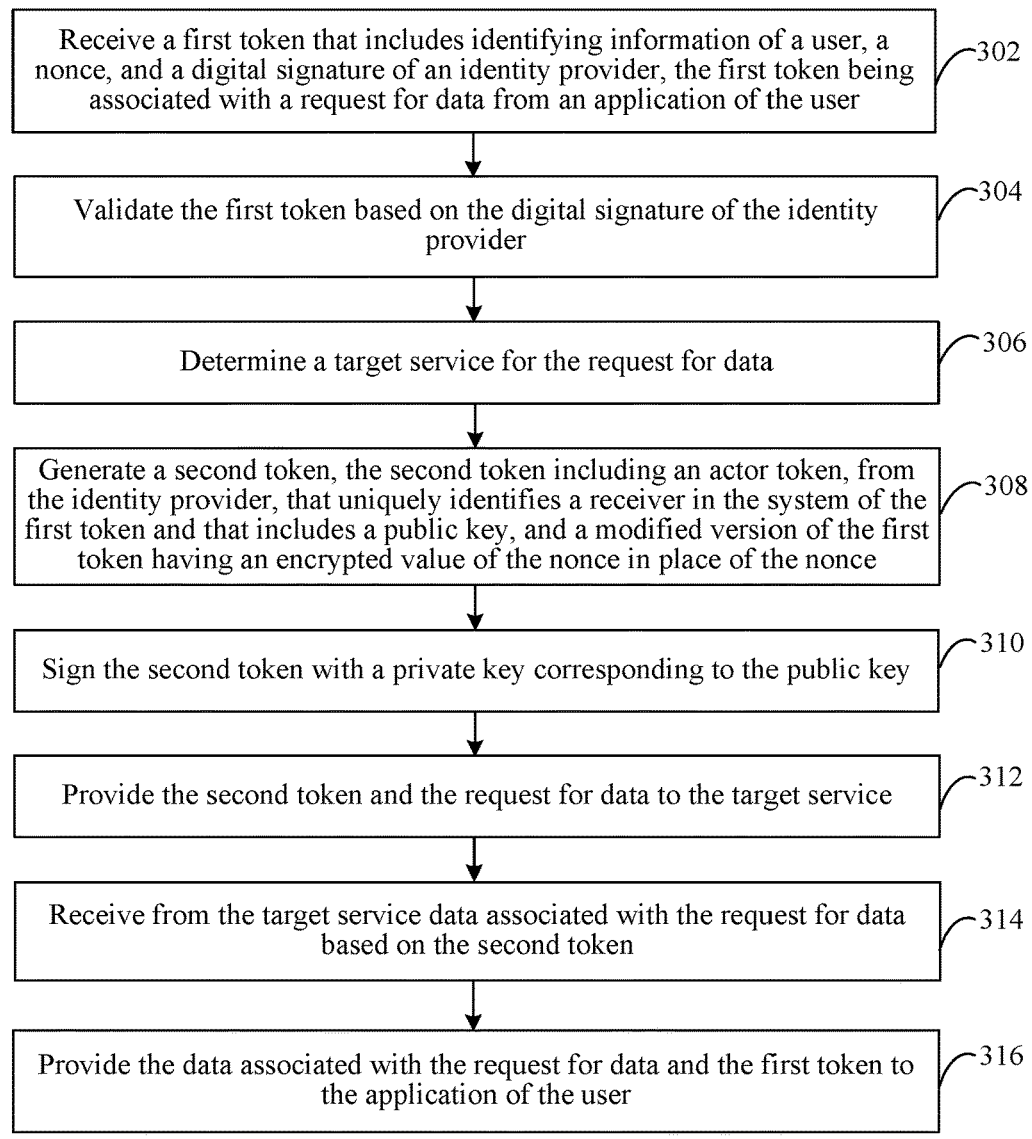
FIG. 3 shows a flowchart for hardening security between web services using protected forwarded access tokens, according to an example embodiment.
Figure 4:
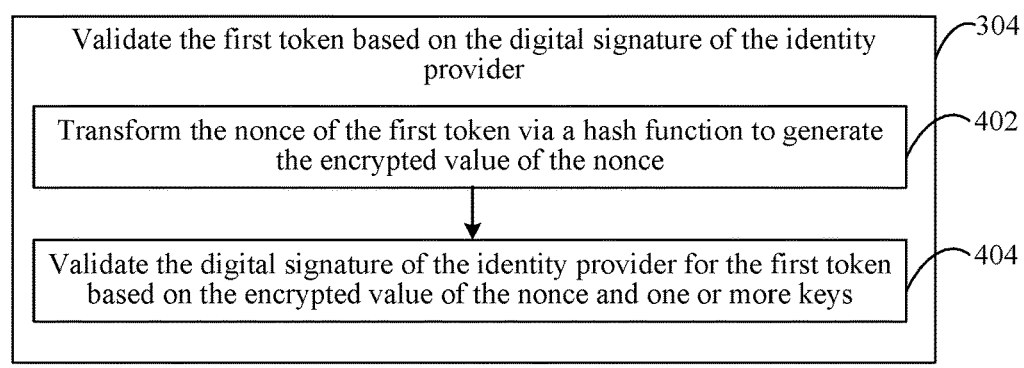
FIG. 4 shows a flowchart for hardening security between web services using protected forwarded access tokens, according to an example embodiment.

For instance, FIG. 3 and FIG. 4 will now be described. FIG. 3 shows a flowchart 300 and FIG. 4 shows a flowchart 400 for hardening security between web services using protected forwarded access tokens, according to example embodiments. Forwarding manager 208 may operate according to flowchart 300 and flowchart 400, in embodiments. Further structural and operational examples will be apparent to persons skilled in the relevant art(s) based on the following description.

Flowchart 300 and flowchart 400 are described as follows with respect to system 100 of FIG. 1 and system 200 of FIG. 2. Forwarding manager 208 is described for flowchart 300 and flowchart 400 as being instantiated in a front end service host, e.g., service host 106a.

Flowchart 300 begins at step 302. In step 302, a first token is received that includes identifying information of a user, a nonce, and a digital signature of an identity provider, the first token being associated with a request for data from an application of the user. For example, receive-transmit manager 210 of forwarding manager 208 of system 200 in FIG. 2 may be configured to receive incoming first tokens, such as user tokens or originating tokens from another service, that accompany a request for data from an entity or individual or user, such as a user of client device 102, over network 110 of FIG. 1. Incoming tokens and data requests may specify a particular user/entity making the data request, and tokens received by receive-transmit manager 210 from client device 102 may include a nonce, e.g., a random or arbitrary number or alpha-numeric string.

In embodiments, client device 102 may receive the first token from an identity provider, such as ID provider host 104, and then send the first token with the request for data to be received by receive-transmit manager 210. First tokens may also include a digital signature of the identity provider. For example, ID provider host 104, via token generator 116, may generate first/user tokens and initially provide the tokens to user device 102. The first token signature may be generated based on a hashed or encrypted value of the nonce, while the first token may be provided to client device 102 with the non-hashed/unencrypted nonce in the token.

In step 304 of flowchart 300, the first token is validated based on the digital signature of the identity provider. For instance, token validator 216 may be configured to validate the first token, e.g., the received token or user token of step 302. Token validator 216 may validate the first token by verifying the digital signature applied to the token. In embodiments, step 304 may include one or more additional sub-steps that are performed for the validation. Referring also now to FIG. 4, flowchart 400 is described.

In step 402 of flowchart 400, the nonce of the first token is transformed via a hash function to generate the encrypted value of the nonce. For example, nonce manager 218 may be configured to extract the nonce from the first token, and to transform the nonce included in the first token. In some embodiments, the nonce may be extracted by token validator 216 and provided to nonce manager 218. The nonce may be transformed by nonce manager 218 according to a hash function, such as a Secure Hash Algorithm 2 (SHA-2). In embodiments, the transformation performed by nonce manager 218 is the same transformation used by ID provider 104 to generate the digital signature for the first token based on the hash function. In this way, forwarding manager 208 is configured to recreate the hashed/encrypted nonce used by ID provider 104 to generate the digital signature and thus validate the token based on the hashed nonce. Nonce manager 218 may be configured to provide the hashed nonce, or in some cases the first token with the hashed nonce in place of the original nonce, to token validator 216.

In step 404, the digital signature of the identity provider for the first token is validated based on the encrypted value of the nonce and one or more keys. For instance, token validator 216 is configured to validate the first token by verifying the digital signature with the hashed nonce in place of the original nonce received. By requiring replacement of the received nonce with the hashed nonce for validation, the first token provides an additional hardened security measure to the overall process of forwarded access tokens for data requests. In other words, ID provider host 104 demands that any service host which attempts to forward the first/user token to another service host be capable of using the same hash/encryption as ID provider host 104. Accordingly, a measure of trust is needed to be established by service hosts with ID provider host 104. Token validator may provide the validated first token, including the hashed/encrypted nonce, to authentication token generator 214.

Referring again to FIG. 3, in step 306 of flowchart 300, a target service is determined for the request for data. For example, target determiner 212 may be configured to determine a target service for the data request. Target determiner 212 may determine target services for data requests based on information in the first token, e.g., a user token, the type of data requested, other information associated with the data request, and/or the like. As an example, a request for a document may have metadata associated therewith that identifies the service or storage for the document. Similarly, a request for event information may be determined to have a target service that is a calendar service associated with or known to the service that receives the first token and request for data from client device 102. Additionally, user information provided with the first token may be used in conjunction with the type of data requested to determine the target service. Target determiner 212 may provide indicia of the determined target service to authentication token generator 214.

In step 308 of flowchart 300, a second token is generated, the second token including an actor token, from the identity provider, that uniquely identifies a receiver in the system of the first token and that includes a public key, and a modified version of the first token having an encrypted value of the nonce in place of the nonce. For instance, authentication token generator 214 may be configured to generate the second token, which may be an authentication token. Authentication token generator 214 may include the first token, as modified with the hashed nonce, in the second token such that the second token encapsulates the first token.

Additionally, an actor token that identifies the computing device executing forwarding manager 208, e.g., computing device 200, service host 106a, etc., may be received from ID provider host 104 as a claim and included in the second token such that the second token encapsulates the actor token. Actor tokens include a public key, e.g., in their header or payload, for the computing device executing forwarding manager 208 that is part of a public/private key pair. An actor token may be any type of token that includes the public key and that is used by a host or service to request data from another host or service.

In step 310 of flowchart 300, the second token is signed with a private key corresponding to the public key. For instance, the second token generated in step 308 is signed by authentication token generator 214 using the private key of the public/private key pair that corresponds to the public key in the actor token.

In step 312 of flowchart 300, the second token and the request for data are provided to the target service. For example, the second token generated in step 310 may be provided from service host 106a to service host 106b over network 110. The second token may be provided from authentication token generator 214 via receive-transmit manager 210, according to embodiments.

As noted herein, improvements to security for token forwarding are realized according to embodiments. In this example, service host 106b will only accept the actor token if the actor token is signed, includes the public key, and is inside the authentication token. Moreover, service host 106b will only accept the authentication token if the authentication token has an audience designated as service host 106b and is signed by ID provider host 104 using the private key corresponding to the public key. Using the same key for the actor token as for the authentication token reduces the need of service host 106b to have a discovery endpoint (i.e., a routing endpoint to verify the server is calling the correct host with the correct permissions to get the requested data). Here, the endpoint is only called once, and thus network traffic and resources of ID provider host 104 are reduced, in addition to the improvements in security.

The audience of the actor token is specified to be service host 106a where the issuer is ID provider host 104. The audience of user tokens is specified to be the target service, herein service host 106b. The audience for tokens herein may be specified in the tokens by their respective generator by information/data therein, e.g., ID provider host 104. Accordingly, malicious code posing as a service is unable to replay received tokens and is unable to initiate forwarding attacks as the authentication tokens, as well as the encapsulated user and actor tokens, provide levels of trust, indicia of audience, and specified security checks, that include aspects relating to each entity involved in the process of token forwarding for the data request.

In step 314, data associated with the request for data is received from the target service based on the second token. For instance, the second token provided to the target service in step 312 may cause the target service to retrieve and return the data associated with the request for data to the computing device executing forwarding manager 208, e.g., computing device 200, service host 106a, etc. The data may be received by receive-transmit manager 210.

In step 316, the data associated with the request for data and the first token are provided to the application of the user. For example, the data received in step 314 and the token may be provided by receive-transmit manager 210 to client device 102. In embodiments, the user token, with hashed, or unmodified, nonce may be provided to client device 102 with the data that was requested.

Figure 5:
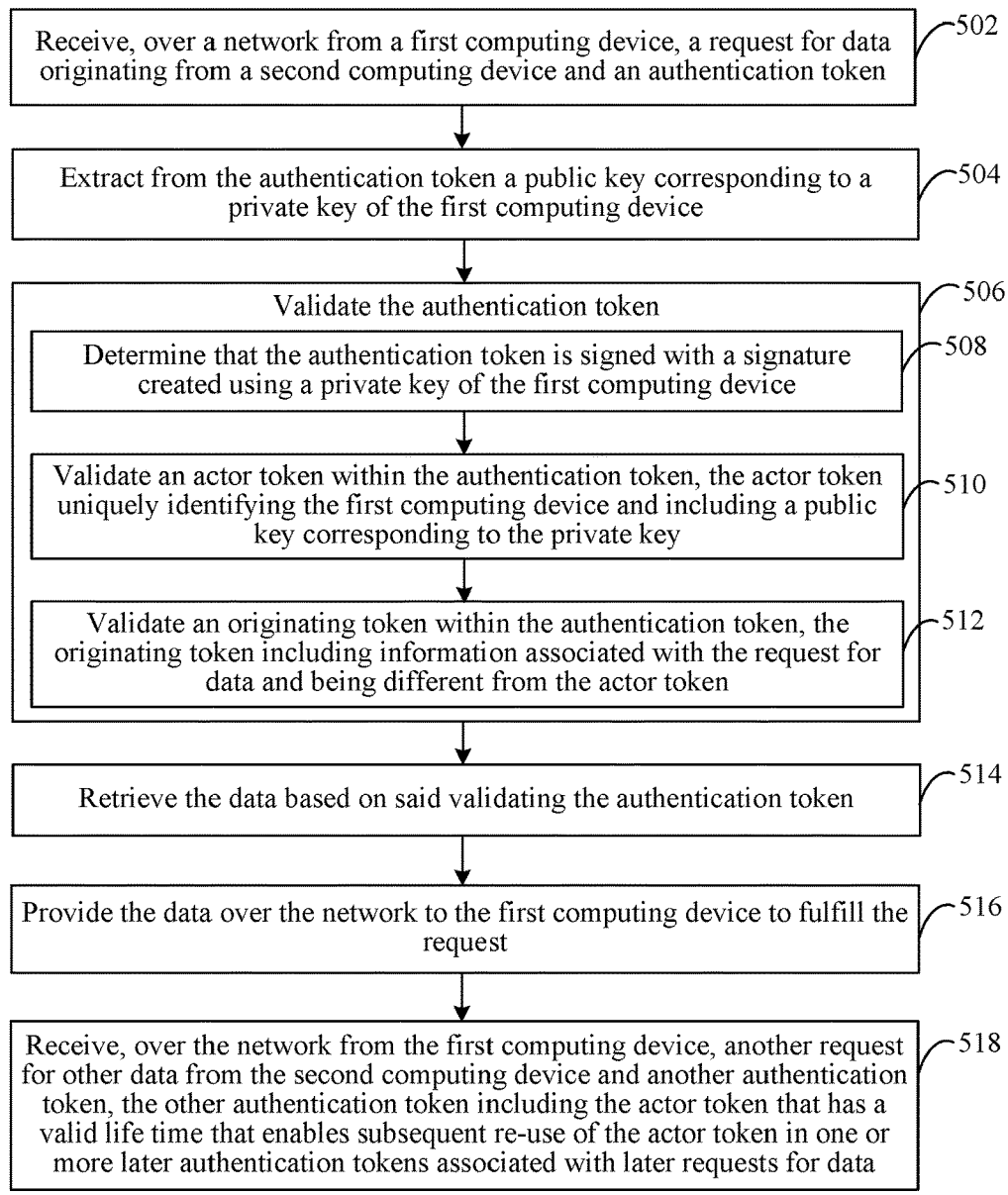
FIG. 5 shows a flowchart for hardening security between web services using protected forwarded access tokens, according to an example embodiment.

Turning now to FIG. 5, it is contemplated herein that performance of one or more embodiments for forwarding manager 208 may take place at the host of the target service described above that acts as a back end service, e.g., service host 106b. That is, the back end service may store, manage, and/or maintain the data requested as described in flowchart 300 of FIG. 3.

In FIG. 5, a flowchart 500 is shown for hardening security between web services using protected forwarded access tokens, according to an example embodiment. Forwarding manager 208 may operate according to flowchart 500 which may be a continuing embodiment of flowchart 300 of FIG. 3. Further structural and operational examples will be apparent to persons skilled in the relevant art(s) based on the following description. Flowchart 500 is described as follows with respect to system 100 of FIG. 1 and system 200 of FIG. 2.

Flowchart 500 begins at step 502. In step 502, a request for data originating from a second computing device and an authentication token are received over a network from a first computing device. For instance, forwarding manager 208 of system 200 may be instantiated and executing at a host server for a back end service or microservice. As shown in FIG. 1, service host 106b may correspond to such a back end service. The authentication token, e.g., second token described above, and the request for data that are provided to the target service in step 312 of flowchart 300 described above are received by receive-transmit manager 210 of forwarding manager 208 in step 502 for the host of the back end service.

In step 504, a public key corresponding to a private key of the first computing device is extracted from the authentication token. For instance, the back end host may be executing an instance of authentication token generator 214 and/or of token validator 216, either of which may be configured to extract the public key from the authentication token, e.g., from the actor token encapsulated in the authentication token. As described above, the public key is part of a public/private key pair associated with the service host that receives the user token and request for data from client device 102. The public key that is extracted in step 504 may be used to validate the request for data by the back end host.

In step 506, the authentication token is validated. For example, token validator 216 may be configured to validate the authentication token received in step 502. The validation may be performed using, at least in part, the extracted public key from step 504. In embodiments, step 506 may include one or more sub-steps such as, but not limited to, step 508, step 510, and/or step 512 described below.

In step 508, it is determine that the authentication token is signed with a signature created using a private key of the first computing device. For instance, token validator 216 may be configured to determine that the authentication token is properly signed with the private key of the public/private key pair described herein. Such a determination may be made using the public key extracted from the authentication token, e.g., in the encapsulated actor token therein which may be decoded by token validator 216 to extract the public key. Because the public and the private keys are a pair, the signature for the authentication token can be verified as coming from the front end host.

In step 510, an actor token within the authentication token is validated, the actor token uniquely identifying the first computing device and including a public key corresponding to the private key. For example, token validator 216 may be configured to validate the actor token by determining that the actor token is encapsulated within the authentication token. As noted above, an actor token identifies the computing device or host that executes an instance of forwarding manager 208, e.g., service host 106a, and may be generated by ID provider host 104. As an additional security measure for forwarding the actor token to the target service, authentication token generator 214 is configured to encapsulate the actor token in the authentication token which is checked by token validator 216. Token validator 216 may be further configured to validate the actor token based on the public key by validating the signature of the actor token.

In step 512, an originating token within the authentication token is validated, the originating token including information associated with the request for data and being different from the actor token. For instance, token validator 216 may be configured to validate the originating token, e.g., the first token or the modified user token, encapsulated by the authentication token. The originating token may be validated based on metadata and/or user data associated with requesting entity. Such data may be provided by an identity provider host such as ID provider host 104 of FIG. 1, and may be included in, or with, the originating token, the request for data, and/or user information accompanying the token and the request. The host of the target service may be provided with credentials and/or information to validate the originating token in various ways and at any time prior to the validation.

In step 514, the data is retrieved based on said validating the authentication token. For example, based on the validation performed by token validator 216 in step 506, data manager 220 may be enabled to retrieve the requested data. The data may be maintained in a storage, such as storage 114 of FIG. 1, or in any other manner by the host of the target service.

In step 516, the data is provided over the network to the first computing device to fulfill the request. For instance, data manager 220 may be configured to provide, via receive-transmit manager 210, the data from the data request back to the front end host from which the authentication token was first provided.

As noted here, actor tokens may include life time attributes that allow the actor tokens to remain valid for a set period of time. In other words, a valid, generated actor token may be used in communications and/or requests by a front end host, for different and subsequent user/entity data requests, at any time during the life time of the actor token without providing additional requests for the actor tokens to the identity provider host.

Accordingly, in step 518, another request for other data is received over the network from the first computing device from the second computing device and another authentication token, the other authentication token including the actor token that has a valid life time that enables subsequent re-use of the actor token in one or more later authentication tokens associated with later requests for data. In embodiments, step 518 may be similarly performed as described above for step 502 where the other (and subsequent) request for other data uses the same actor token encapsulated with a different originating token within a different authentication token.

Figure 6:
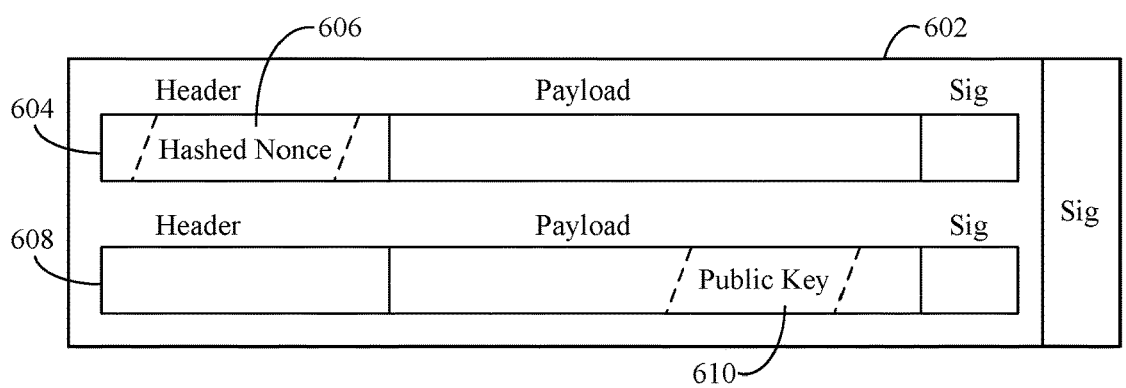
FIG. 6 shows a diagram of protected forwarded access tokens for hardening security between web services, according to an example embodiment.

Turning now to FIG. 6, a diagram of a protected forwarded access token 600 ("token" 600, hereinafter) for hardening security between web services is shown, according to an example embodiment. Token 600 may be an embodiment of the authentication tokens described above. Token 600 may be generated and signed by authentication token generator 214 of system 200, e.g., acting as a front end service host, according to embodiments.

As shown, token 600 includes an encapsulating token portion 602 having a digital signature. The digital signature may be generated by authentication token generator 214 based on a private key of a public/private key pair for the front end service or its host. Encapsulating token portion 602 may be a proof of possession (POP) token portion, and may include its own header and/or payloads (not shown for brevity and illustrative clarity).

Token 600 also includes an originating token 604, e.g., a user token, that has a header and a payload, and that is signed with a digital signature. In embodiments, originating token 604 may be a modified user token. That is, originating token 604 may include a hashed nonce 606 in the header of the token, as described herein. Hashed nonce 606 may be used to generate the signature of originating token 604.

Token 600 also includes an actor token 608 that has a header and a payload, and that is signed with a digital signature. The payload of actor token 608 includes a public key 610 that corresponds to a public/private key pair of the front end service host executing the instance of authentication token generator 214. The digital signature of actor token 608 may be generated based on the private key of the public/private key pair that is associated with public key

610. Digital signatures as described herein may be based on the Rivest-Shamir-Adleman (RSA) cryptosystem and/or the like.

In embodiments, token 600 may include a timestamp based on its creation and a universal resource locator or other identifier associated with the target host. In embodiments, as noted above, an authentication token may be a POP token, and an actor token may be based on a JavaScript Object Notation (JSON) token, e.g., a JSON Web Token (JWT). Actor tokens may be generated by identity provider hosts such as ID provider host 104 based on the public key and without any user information. Accordingly, security for the forwarding of tokens to target devices is improved.

Figure 7:
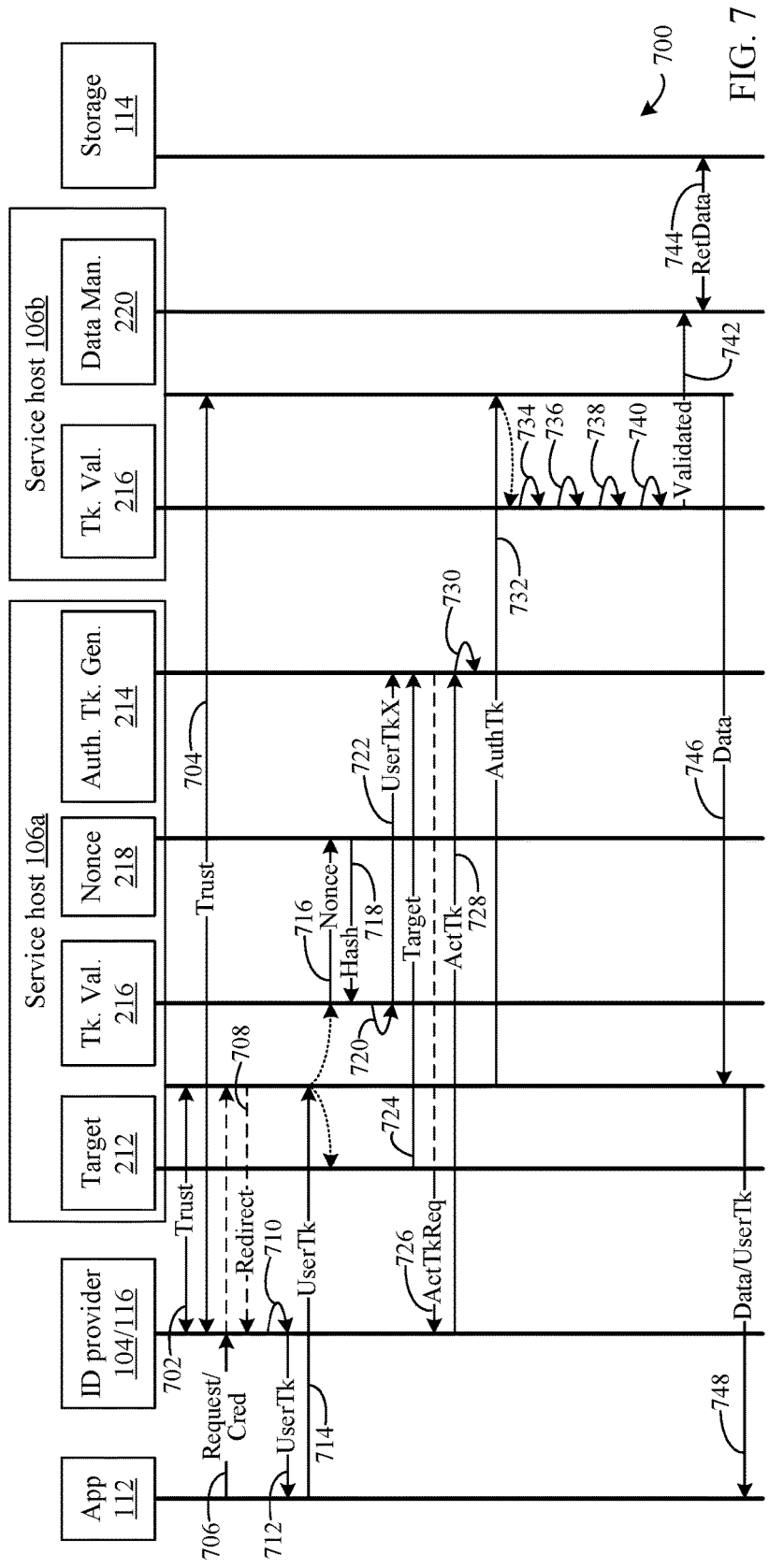
FIG. 7 shows a flow diagram for hardening security between web services using protected forwarded access tokens, according to an example embodiment.

FIG. 7 shows a flow diagram 700 for hardening security between web services using protected forwarded access tokens, according to an example embodiment. In embodiments, system 100 in FIG. 1 and/or system 200 in FIG. 2 may be configured to perform functions of flow diagram 700. Flow diagram 700 may be a further embodiment of flowchart 300 of FIG. 3 and flowchart 500 of FIG. 5. Flow diagram 700 is described as follows with reference to system 100 of FIG. 1 and system 200 of FIG. 2.

Flow diagram 700 begins at step 702 and step 704. In step 702, a trust relationship is established between ID provider 104 and service host 106a, and in step 704, a trust relationship is established between ID provider host 104 and service host 106b. Trust relationships may be created by system administrators of the hosts, and may be embodied through the use of actor tokens as described herein. Additional indicia of trust relations may also be used, according to embodiments, such as but not limited to, different types of identifiers or keys exchanged, specific values or types of data/information used in communications, etc.

In step 706, application 112 of client device 102 provides a request for data and/or credentials to ID provider host 104. In embodiments, where a user of client device 102 is not "logged in" or does not otherwise have session established with ID provider host 104, user credentials may be used, and checked, to establish such a session. In some embodiments for step 706, the request for data may be provided to front end service host 106a which redirects the request to ID provider host 104 at optional step 708. At step 710, ID provider host 104 generates a first token, or a user token, utilizing token generator 116, as described in further detail below with respect to FIG. 8, and provides the generated first token, along with user information, to client device 102.

In step 714, the generated first token, the request for data, and the user information are provided from client device 102, e.g., via application 112, to service host 106a to be received by receive-transmit manager 210. The first token, the request for data, and the user information may be provided from receive-transmit manager 210 to target determiner 212 and/or token validator 216 upon receipt. In step 716, token validator 216 may extract the nonce from the first token and call, or provide the nonce to, nonce manager 218.

In step 718, nonce manager 218 is configured to perform a hash function or encryption, e.g., a SHA-2 function, on the nonce and return the transformed nonce to token validator 216. In step 720, token validator 216 is configured to validate the first token, now transformed with the hashed nonce, by verifying the digital signature thereof. Upon validation, the transformed first token (UserTkX) is provided to authentication token generator 214 at step 722.

In step 724, target determiner 212 is configured to determine the target service for the request for data. Target determiner 212 may make this determination as similarly described in step 306 of flowchart 300 based on information in the first token, e.g., a user token, the type of data requested, other information associated with the data request, and/or the like. Indicia of the determined target service is provided to authentication token generator 214 in step 724 to be used in generating an authentication token.

Additionally, in step 726, a request for an actor token to be included in the authentication token may be provided from service host 106a to ID provider host 104. In embodiments, the request for the actor token may be provided via receive-transmit manager 210 from target determiner 212 or from authentication token generator 214. The request to ID provider host 104 for the actor token may include a public key of service host 106a, may be signed with a private key corresponding to the public key, and may be made without providing any user data to ID provider host 104. In step 728, the actor token that includes the public key is provided from ID provider host 104 to service host 106a and authentication token generator 214, e.g., via receive-transmit manager 210.

In step 730, authentication token generator 214 generates the authentication token that encapsulates the actor token and the transformed first token and that is signed with a private key that corresponds to the public key in the actor token, as described with respect to FIG. 6 above. At step 732, the authentication token may be provided, e.g., via receive-transmit manager 210, to service host 106b which may function as a back end, or target, service host. The authentication token may be received by service host 106b via its own instantiation of forwarding manager 208 and receive-transmit manager 210, which may in turn provide the authentication token to token validator 216 at service host 106b.

In step 734, token validator 216 of service host 106b (or authentication token generator 214 in embodiments) is configured to extract the public key from the actor token within the authentication token. Next, the authentication token is validated by token validator 216. For example, in step 736, the signature of the authentication token is checked to determine if the signature was generated based on the private key that corresponds to the public key from the actor token. In step 738, the actor token is validated by determining that it is encapsulated within the authentication token, and that it was signed with the private key, and in step 740, the first/originating token, e.g., the transformed user token, may be validated by token validator 216 based on metadata and/or user data associated with request.

In step 742, when/if the authentication token is validated, a validation signal and the request for data may be provided to data manager 220 causing data manager to retrieve the data. Data manager 220 is configured to retrieve the requested data in step 744 from a storage such as storage 114 of FIG. 1. The retrieved data is provided, e.g., via receive-transmit manager 210, from service host 106b to service host 106a over network 110 in step 746. In step 748, service host 106a provides the requested data to application 112 of client device 102. In embodiments, the original or the transformed first/originating token, e.g., the user token, may be provided with the requested data to client device 102.

Figure 8:
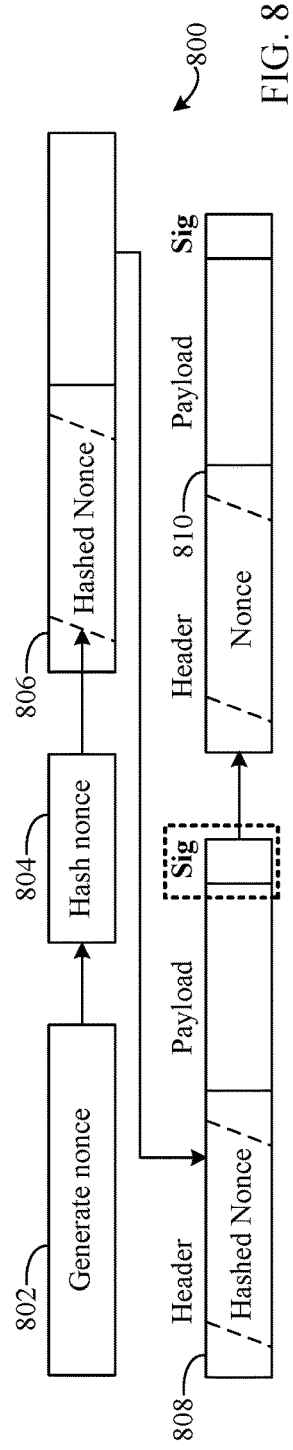
FIG. 8 shows a flow diagram for hardening security between web services using protected forwarded access tokens, according to an example embodiment.

Referring now to FIG. 8, a flow diagram 800 for hardening security between web services using protected forwarded access tokens is shown, according to an example embodiment. In embodiments, token generator 116 of ID provider host 104 in FIG. 1 may be configured to perform functions of flow diagram 800 to generate user tokens, e.g., first tokens as described in flowchart 300. Flow diagram 800 may be a further embodiment of flowchart 300 of FIG. 3, e.g., prior to step 302. Flow diagram 800 is described as follows with reference to system 100 of FIG. 1.

Flow diagram 800 begins at step 802. In step 802, a nonce is generated. In embodiments, the nonce is generated by ID provider host 104 and/or token generator 116. The nonce may comprise numeric or alpha-numeric values in embodiments. In step 804, the nonce is encrypted or hashed by ID provider host 104 and/or token generator 116. In embodiments, token generator 116 may hash the nonce according to a SHA-2 function. As noted herein, token validator 216 may use the same hash function as nonce manager 218 in flowchart 300 of FIG. 3.

In step 806, token generator 116 is configured to generate a first token, e.g., a user token, which includes the hashed nonce in the header. In step 808, a digital signature is generated by token generator 116 for the first token using the hashed nonce value in the header. That is, the digital signature of the first token is generated using based on the hashed nonce value, not the original, nonce. In step 810, token generator 116 is configured to remove the hashed nonce value from the header of the first token and replace it with the original, nonce to complete the first token (e.g., the user token).

Accordingly, to validate the first token, a receiving entity/service is required to extract the nonce, hash the nonce using the same hash function that was used by token generator 116, and then use the recreated hashed nonce to validate the digital signature thus improving security for forwarding tokens to target services. That is, requiring a receiving entity/service to perform the same hash used by ID provider host 104 prevents replays of the first/user token. In other words, anytime an entity/services receives a token via "bearer authorization" with a nonce in the header, it must perform the proper translation before checking the signature of the token.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, such as system 100 of FIG. 1 and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a computing device in stationary or mobile computer embodiments, including one or more features of mobile systems and/or computing devices described herein, as well as alternative features. The descriptions of computing devices/systems provided herein are provided for purposes of illustration, and are not intended to be limiting. Embodiments may be implemented in further types of computer systems, as would be known to persons skilled in the relevant art(s).

Figure 9:
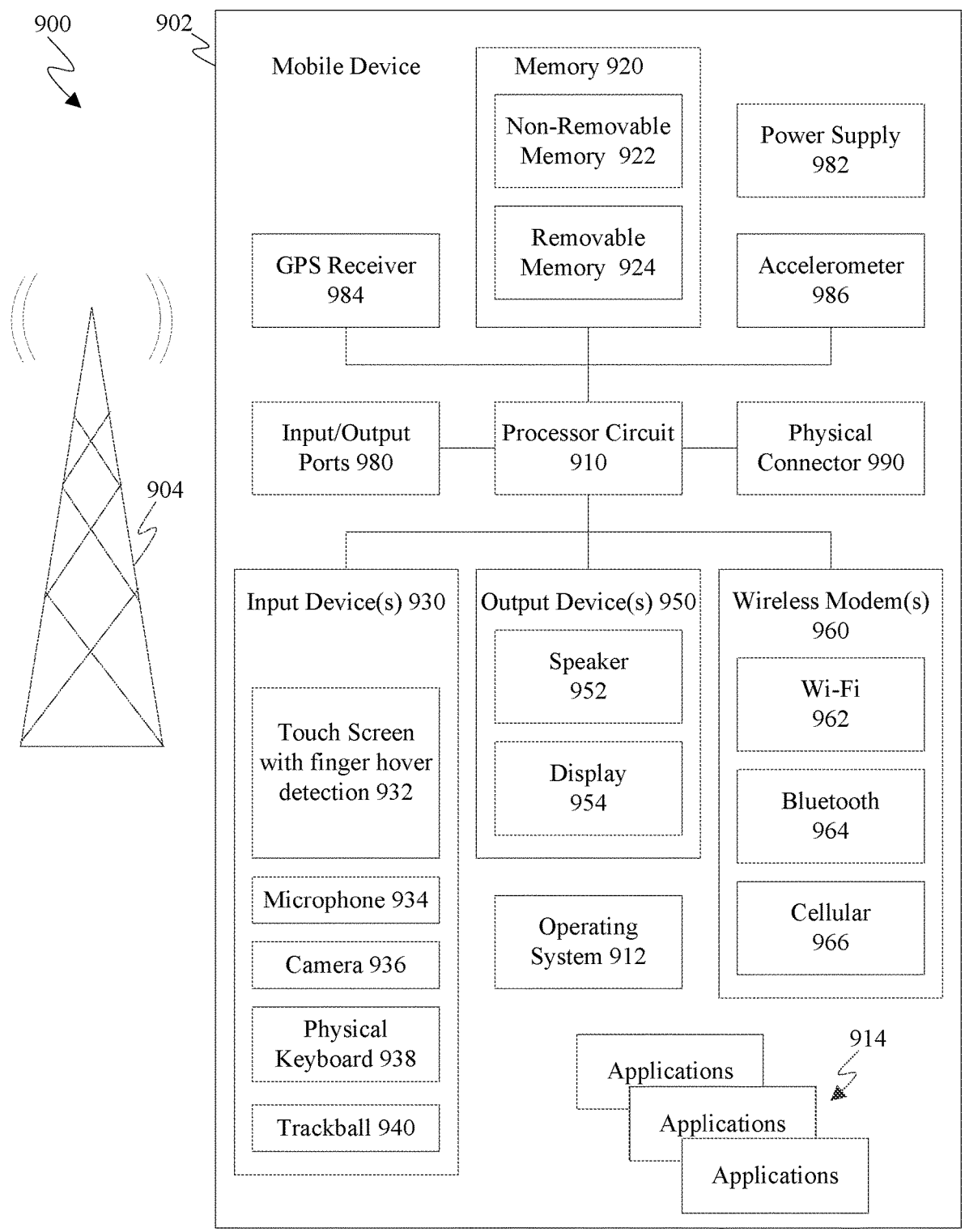
FIG. 9 shows a block diagram of an example mobile device that may be used to implement embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1 and system 200 of FIG. 2, along with any components and/or subcomponents thereof, as well as the flowcharts/flow diagrams described herein, including portions thereof, and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
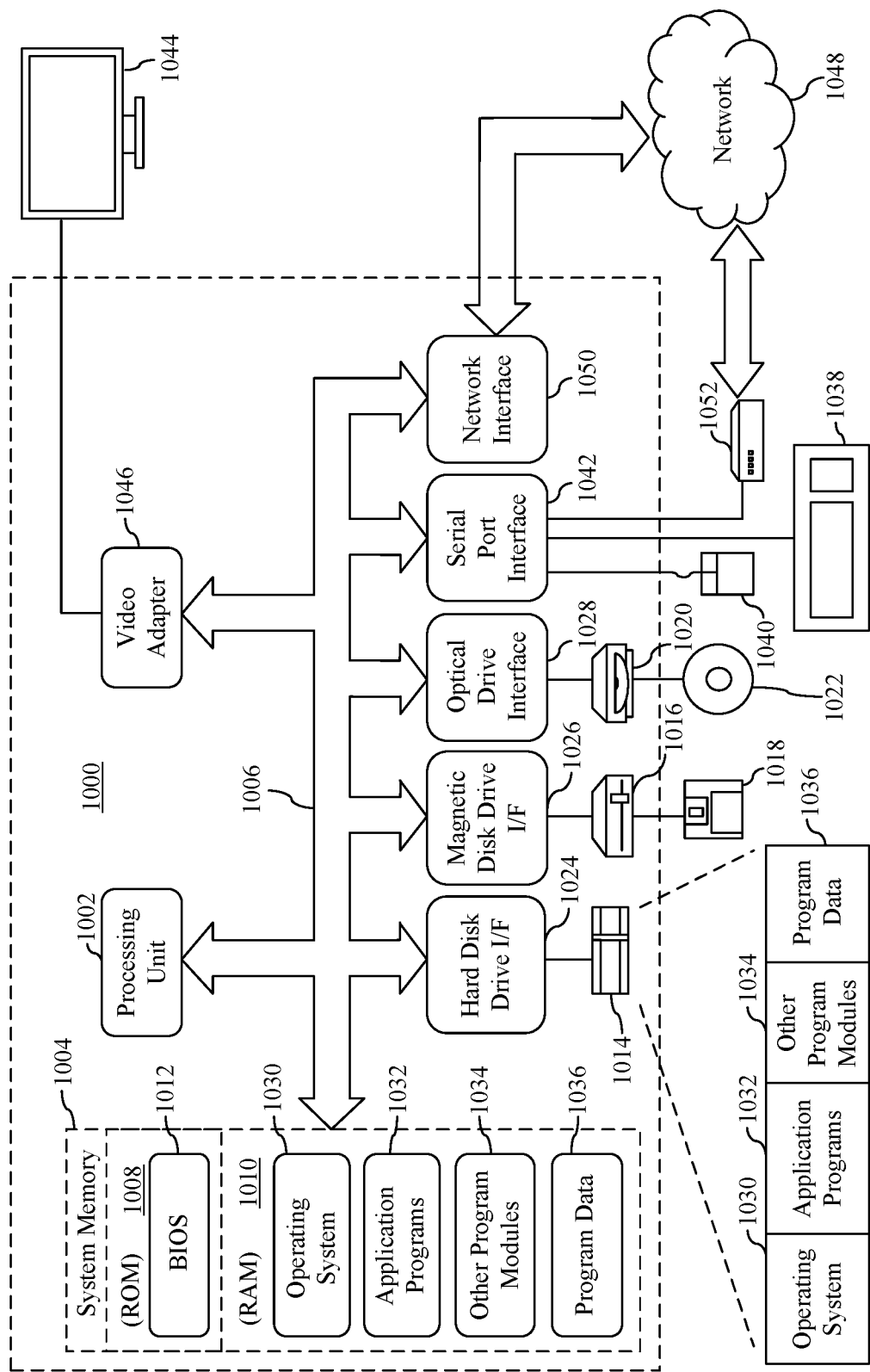
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002 (also "processing unit" herein), a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as system 100 of FIG. 1 and system 200 of FIG. 2, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described embodiments for hardening security between web services using protected forwarded access tokens are applicable beyond the example embodiments described above. For example, while embodiments in the Sections above may be described in the context of data requests, the embodiments herein are not so limited and may also be applied for other types of requests, accesses, jobs, functions, and/or processes that may be run to utilize forwarding tokens and improved security.

Furthermore, the described embodiments do not exist in software implementations for hardening security between web services using protected forwarded access tokens. Conventional solutions lack the ability to scale for forwarding tokens over many nodes, or service hosts, to reach a target service or end point. Conventional solutions are also susceptible to replays of tokens, and to leaking of information as well as forwarding attacks. That is, unlike the embodiments herein, conventional solutions do not allow for a level of validation of tokens and trust that prevents replays, leaking, and forwarding attacks. As an example, embodiments provide for systems capable of requiring services that receive tokens on bearer authorization protocols to perform a hash function on a nonce in order to validate the received tokens, as well as requiring actor tokens that include indicia of trust such as public keys to be encapsulated in wrapper, authentication tokens that are signed with private keys associated with the public keys. Additionally, fewer calls for actor token requests reduces network traffic to identity provider hosts, reduces resources such as processing cycles and memory footprints needed to handle such calls, thus improving the performance of identity providers as well as service hosts, and it also protects in cases when end points go offline. Moreover, in embodiments, identity provider hosts may be configured to record the hash of an actor token payload into the payload itself, thus providing the added security and guarantee that the actor token payload has not changed.

Still further, the described embodiments for hardening security between web services using protected forwarded access tokens also eliminate the need for requests for actor tokens to be sent to identity provider hosts on each access request to a target service for each user of the system.

The additional examples and embodiments described in this Section may be applicable to examples disclosed in any other Section or subsection of this disclosure.

A system is described herein. The system may be configured and enabled in various ways for hardening security between web services using protected forwarded access tokens, as described herein according to embodiments. The system includes at least one processor, and a memory that stores computer program instructions that are executable by the at least one processor. The computer program instructions configured to receive a first token that includes identifying information of a user, a nonce, and a digital signature of an identity provider, the first token being associated with a request for data from an application of the user, and to validate the first token based on the digital signature of the identity provider. The computer program instructions are also configured to determine a target service for the request for data, and to generate a second token, the second token including an actor token, from the identity provider, that uniquely identifies a receiver in the system of the first token and that includes a public key, and a modified version of the first token having an encrypted value of the nonce in place of the nonce. The computer program instructions are also configured to provide the second token and the request for data to the target service.

In an embodiment of the system, the digital signature of the identity provider is generated based on the encrypted value of the nonce, and the computer program instructions, to validate the first token based on the digital signature of the identity provide, are further configured to transform the nonce of the first token via a hash function to generate the encrypted value of the nonce, and validate the digital signature of the identity provider for the first token based on the encrypted value of the nonce and one or more keys.

In an embodiment of the system, the computer program instructions, to generate the second token, are configured to sign the second token with a private key corresponding to the public key.

In an embodiment of the system, the computer program instructions are configured to provide a request for the actor token to the identity provider, the request including the public key, and receive the actor token from the identity provider. In the embodiment, the actor token has a valid life time that enables subsequent re-use of the actor token by the receiver in the system during the valid life time of the actor token without providing additional requests for actor tokens to the identity provider.

In an embodiment of the system, the receiver in the system, and the target service, each have a respective pre-existing trust relationship with the identity provider, where the pre-existing trust relationship of the receiver in the system includes the public key and the private key as a portion of an established client identifier for the receiver in the system that designates the receiver in the system as an audience of the first token or the modified version of the first token.

In an embodiment of the system, computer program instructions are configured to receive from the target service data associated with the request for data based on the second token, and provide the data associated with the request for data and the first token to the application of the user.

In an embodiment, the system further incudes the identity provider and the target service.

A method implemented by a host computing device is also described herein. In embodiments, the method is for hardening security between web services using protected forwarded access tokens. The method may be implemented by a service host according to embodiments. The method includes receiving, over a network from a first computing device, a request for data originating from a second computing device and an authentication token, and validating the authentication token. Validating the authentication token includes determining that the authentication token is signed with a signature created using a private key of the first computing device, validating an actor token within the authentication token, the actor token uniquely identifying the first computing device and including a public key corresponding to the private key, and validating an originating token within the authentication token, the originating token including information associated with the request for data and being different from the actor token. The method also includes retrieving the data based on said validating the authentication token.

In an embodiment of the method, the second computing device is a user device and the originating token is a user token, and validating the authentication token includes validating user information from the user token associated with the request, the user information including a user identifier and indicia of a scope of consent for accessing the data.

In an embodiment, the method further includes extracting from the authentication token the public key corresponding to the private key, where validating the authentication token includes validating based on the public key.

In an embodiment of the method, the actor token is generated by an identity provider with which the first computing device and the host computing device have a pre-existing trust relationship.

In an embodiment of the method, the actor token has a valid life time that enables subsequent re-use of the actor token in one or more later authentication tokens associated with later requests for data.

In an embodiment, the method further includes, subsequent to the retrieving, receiving, over the network from the first computing device, another request for other data from the second computing device and another authentication token, the other authentication token including the actor token.

In an embodiment, the method further includes, subsequent said retrieving, providing the data over the network to the first computing device to fulfill the request.

A computer-readable storage medium having program instructions recorded thereon that, when executed by one or more processors, perform a method for hardening security between web services using protected forwarded access tokens. In embodiments, the method is implemented via systems and devices, as described herein. The method includes receiving a first token that includes identifying information of a user, a nonce, and a digital signature of an identity provider, the first token being associated with a request for data from an application of the user. The method also includes determining a target service for the request for data, and generating a second token. The second token includes an actor token, from the identity provider, that uniquely identifies a receiver in the system of the first token and that includes a public key, and a modified version of the first token having an encrypted value of the nonce in place of the nonce. The method also includes providing the second token and the request for data to the target service.

In an embodiment of the computer-readable storage medium, the digital signature of the identity provider is generated based on the encrypted value of the nonce. In the embodiment, the method further includes validating the first token prior to generating the second token. The validating of the first token includes transforming the nonce of the first token via a hash function to generate the encrypted value of the nonce, and validating the digital signature of the identity provider for the first token based on the encrypted value of the nonce and one or more keys.

In an embodiment of the computer-readable storage medium, generating the second token includes signing the second token with a private key corresponding to the public key.

In an embodiment of the computer-readable storage medium, the method further includes providing a request for the actor token to the identity provider, the request including the public key, and receiving the actor token from the identity provider. In the embodiment, the actor token has a valid life time that enables subsequent re-use of the actor token by the receiver in the system during the valid life time of the actor token without providing additional requests for actor tokens to the identity provider.

In an embodiment of the computer-readable storage medium, the receiver in the system, and the target service, each have a respective pre-existing trust relationship with the identity provider, where the pre-existing trust relationship of the receiver in the system includes the public key and the private key as a portion of an established client identifier for the receiver in the system that designates the receiver in the system as an audience of the first token or the modified version of the first token.

In an embodiment of the computer-readable storage medium, the method includes receiving from the target service data associated with the request for data based on the second token, and providing the data associated with the request for data and the first token to the application of the user.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
   at least one processor; and
   a memory that stores computer program instructions that are executable by the at least one processor, the computer program instructions configured to:
      receive a first token that includes identifying information of a user, a nonce, and a digital signature of an identity provider, the first token being associated with a request for data from an application of the user;
      validate the first token based on the digital signature of the identity provider;
      determine a target service for the request for data;
      generate a second token, the second token including:
         an actor token, from the identity provider, that uniquely identifies a receiver in the system of the first token and that includes a public key, and
         a modified version of the first token having an encrypted value of the nonce in place of the nonce; and
      provide the second token and the request for data to the target service.

2. The system of claim 1, wherein the digital signature of the identity provider is generated based on the encrypted value of the nonce; and
   wherein the computer program instructions, to validate the first token based on the digital signature of the identity provider, are further configured to:
      transform the nonce of the first token via a hash function to generate the encrypted value of the nonce; and
      validate the digital signature of the identity provider for the first token based on the encrypted value of the nonce and one or more keys.

3. The system of claim 1, wherein the computer program instructions, to generate the second token, are configured to:
   sign the second token with a private key corresponding to the public key.

4. The system of claim 3, wherein the computer program instructions are configured to:
   provide a request for the actor token to the identity provider, the request including the public key; and
   receive the actor token from the identity provider;
   the actor token having a valid life time that enables subsequent re-use of the actor token by the receiver in the system during the valid life time of the actor token without providing additional requests for actor tokens to the identity provider.

5. The system of claim 4, wherein the receiver in the system, and the target service, each have a respective pre-existing trust relationship with the identity provider, where the pre-existing trust relationship of the receiver in the system includes the public key and the private key as a portion of an established client identifier for the receiver in the system that designates the receiver in the system as an audience of the first token or the modified version of the first token.

6. The system of claim 1, wherein the computer program instructions are configured to:
   receive from the target service data associated with the request for data based on the second token; and
   provide the data associated with the request for data and the first token to the application of the user.

7. The system of claim 1, further comprising the identity provider and the target service.

8. A method implemented by a host computing device, comprising:
   receiving, over a network from a first computing device, a request for data originating from a second computing device and an authentication token;
   validating the authentication token, including:
      determining that the authentication token is signed with a signature created using a private key of the first computing device,
      validating an actor token within the authentication token, the actor token uniquely identifying the first computing device and including a public key corresponding to the private key, and
      validating an originating token within the authentication token, the originating token including information associated with the request for data and being different from the actor token; and
   retrieving the data based on said validating the authentication token.

9. The method of claim 8, wherein the second computing device is a user device and the originating token is a user token; and
   wherein validating the authentication token includes:
      validating user information from the user token associated with the request, the user information including a user identifier and indicia of a scope of consent for accessing the data.

10. The method of claim 8, the method further comprising:
    extracting from the authentication token the public key corresponding to the private key;
    wherein said validating the authentication token includes validating based on the public key.

11. The method of claim 8, wherein the actor token is generated by an identity provider with which the first computing device and the host computing device have a pre-existing trust relationship.

12. The method of claim 11, wherein the actor token has a valid life time that enables subsequent re-use of the actor token in one or more later authentication tokens associated with later requests for data.

13. The method of claim 12, further comprising, subsequent to said retrieving:
    receiving, over the network from the first computing device, another request for other data from the second computing device and another authentication token, the other authentication token including the actor token.

14. The method of claim 8, further comprising:
    subsequent to said retrieving, providing the data over the network to the first computing device to fulfill the request.

15. A computer-readable storage medium having program instructions recorded thereon that, when executed by one or more processors of a system, perform a method, the method comprising:
    receiving a first token that includes identifying information of a user, a nonce, and a digital signature of an identity provider, the first token being associated with a request for data from an application of the user;

determining a target service for the request for data;
generating a second token, the second token including:
   an actor token, from the identity provider, that uniquely identifies a receiver in the system of the first token and that includes a public key, and
   a modified version of the first token having an encrypted value of the nonce in place of the nonce; and
providing the second token and the request for data to the target service.

16. The computer-readable storage medium of claim 15, wherein the digital signature of the identity provider is generated based on the encrypted value of the nonce; and
   wherein the method further comprises validating the first token prior to generating the second token, said validating the first token including:
      transforming the nonce of the first token via a hash function to generate the encrypted value of the nonce; and
      validating the digital signature of the identity provider for the first token based on the encrypted value of the nonce and one or more keys.

17. The computer-readable storage medium of claim 15, wherein generating the second token includes:
   signing the second token with a private key corresponding to the public key.

18. The computer-readable storage medium of claim 17, wherein the method further comprises:
   providing a request for the actor token to the identity provider, the request including the public key; and
   receiving the actor token from the identity provider;
   the actor token having a valid life time that enables subsequent re-use of the actor token by the receiver in the system during the valid life time of the actor token without providing additional requests for actor tokens to the identity provider.

19. The computer-readable storage medium of claim 18, wherein the receiver in the system, and the target service, each have a respective pre-existing trust relationship with the identity provider, where the pre-existing trust relationship of the receiver in the system includes the public key and the private key as a portion of an established client identifier for the receiver in the system that designates the receiver in the system as an audience of the first token or the modified version of the first token.

20. The computer-readable storage medium of claim 15, wherein the method comprises:
   receiving from the target service data associated with the request for data based on the second token; and
   providing the data associated with the request for data and the first token to the application of the user.

\* \* \* \* \*